United States Patent
Gunturu

(10) Patent No.: US 10,452,753 B2
(45) Date of Patent: Oct. 22, 2019

(54) 3D VISUALIZATION AND MANAGEMENT OF RESERVOIR MONITORING DATA

(71) Applicant: Sristy Technologies LLC, Houston, TX (US)

(72) Inventor: Sashi B. Gunturu, Katy, TX (US)

(73) Assignee: Sristy Technologies LLC, Houston, TX (US)

( * ) Notice: Subject to any disclaimer, the term of this patent is extended or adjusted under 35 U.S.C. 154(b) by 692 days.

(21) Appl. No.: 14/014,149

(22) Filed: Aug. 29, 2013

(65) Prior Publication Data

US 2014/0075297 A1    Mar. 13, 2014

Related U.S. Application Data

(60) Provisional application No. 61/694,439, filed on Aug. 29, 2012.

(51) Int. Cl.
| | | |
|---|---|---|
| G06F 17/00 | (2019.01) | |
| G06F 17/21 | (2006.01) | |
| G06T 11/20 | (2006.01) | |
| G06T 19/00 | (2011.01) | |
| G01V 1/34 | (2006.01) | |

(52) U.S. Cl.
CPC .......... *G06F 17/217* (2013.01); *G06T 11/206* (2013.01); *G06T 19/00* (2013.01); *G01V 1/345* (2013.01)

(58) Field of Classification Search
CPC ............................................... G06F 17/30994
See application file for complete search history.

(56) References Cited

U.S. PATENT DOCUMENTS

| | | | | |
|---|---|---|---|---|
| 7,606,666 | B2 * | 10/2009 | Repin et al. | 702/9 |
| 8,073,665 | B2 * | 12/2011 | Watters et al. | 703/10 |
| 8,190,458 | B2 * | 5/2012 | Back et al. | 705/7.31 |

(Continued)

FOREIGN PATENT DOCUMENTS

| | | |
|---|---|---|
| EP | 2 386 881 | 11/2011 |
| EP | 2386881 A1 | 11/2011 |
| WO | 2010/138137 A1 | 12/2010 |
| WO | 2010138137 | 12/2010 |

OTHER PUBLICATIONS

"The HDF Group", www.hdfgroup.org/HDF5, last modified Nov. 13, 2013.

(Continued)

*Primary Examiner* — Scott T Baderman
*Assistant Examiner* — Barbara M Level
(74) *Attorney, Agent, or Firm* — Patterson + Sheridan, LLP

(57) ABSTRACT

Data collected during reservoir monitoring may include fiber optic measurements utilizing a distributed sensing system. Downhole monitoring with the distributed sensing system may generate large amounts of data. For example, the system may be capable of producing the functional equivalent of tens, hundreds, or even thousands of sensors along a length of a wellbore. Continuous monitoring of various properties, including temperature, pressure, Bragg gradient, acoustic, and strain, may create a large volume of data, possibly spanning into several gigabytes. Embodiments of the present invention provide techniques for analyzing a large volume of measurements taken in a wellbore without compromising on the integrity of data.

17 Claims, 5 Drawing Sheets

(56) References Cited

U.S. PATENT DOCUMENTS

| | | | |
|---|---|---|---|
| 8,515,878 B2* | 8/2013 | Radloff et al. | 705/412 |
| 2006/0164245 A1* | 7/2006 | Kibalo | G06Q 10/087 340/572.1 |
| 2006/0293872 A1* | 12/2006 | Zamora et al. | 703/10 |
| 2007/0062696 A1* | 3/2007 | Wilson et al. | 166/254.2 |
| 2007/0220421 A1* | 9/2007 | Sharpe | G06F 17/30905 715/210 |
| 2008/0288306 A1* | 11/2008 | MacIntyre et al. | 705/7 |
| 2009/0229819 A1* | 2/2009 | Repin et al. | 166/250.01 |
| 2010/0107754 A1* | 5/2010 | Hartog et al. | 73/152.47 |
| 2011/0280103 A1* | 11/2011 | Bostick, III | 367/35 |
| 2012/0036466 A1* | 2/2012 | Venon et al. | 715/772 |
| 2012/0201425 A1* | 8/2012 | Stolte | G06T 19/00 382/106 |
| 2012/0299965 A1* | 11/2012 | Agarwal et al. | 345/660 |

OTHER PUBLICATIONS

Chong Zhang, OptiStore: An On-Deman Data Processing Middleware for Very Large Scale Interactive Visualization, Thesis, University of Illinois at Chicago, 2007.

PCT Search Report and Written Opinion for International Application No. PCT/US2013/057378 dated Mar. 4, 2014.

Zhang Chong: "OptiStore: An On-Demand Data Processing Middleware for Very Large Scale Interactive Visualization"; In: "OptiStore: An On-Demand Data Processing Middleware for Very Large Scale Interactive Visualizaation", Jan. 1, 2007 (Jan. 1, 2007), University of Illinois, XP055101519.

PCT, International Search Report and Written Opinion, dated Mar. 4, 2014 for International Application PCT/US2013/057378.

EPO Office Action dated Oct. 23, 2018, for European Application No. 13765542.9.

* cited by examiner

3D VISUALIZATION AND MANAGEMENT OF RESERVOIR MONITORING DATA

BACKGROUND OF THE INVENTION

Field of the Invention

Embodiments of the present invention generally relate to methods and apparatus for analyzing measurements taken in a wellbore. In particular, embodiments of the present invention generally relate to methods and apparatus for visually analyzing measurements taken in a well during its life cycle until abandonement.

Description of the Related Art

Various reservoir monitoring systems have been used to measure important properties such as pressure, temperature, acoustic, strain, and Bragg gradient along the wellbore. Formation properties at downhole subsurface conditions, like porosity, permeability, density, mineral content, electrical conductivity, and bed thickness, and computed fluid properties such as viscosity, chemical elements, and the content of oil, water, and/or gas are essential. Monitoring such properties and conditions, either instantaneously or by determining trends over time, may have significant value in understanding fluid flow through different fluid entries in the producing zones. Examples of reservoir monitoring include utilizing distributed temperature sensing (DTS) or distributed acoustic sensing (DAS) along a length of a wellbore, such that the monitoring is performed with the functional equivalent of tens, hundreds, or thousands of sensors. In other words, a fiber optic cable may function as a continuous sensor. An example of a DAS system will be further described.

FIG. 1 illustrates a schematic cross-sectional view of a wellbore 102, wherein a DAS system 110 may be used to perform acoustic sensing. A DAS system may be capable of producing the functional equivalent of tens, hundreds, or even thousands of acoustic sensors. Properties of the wellbore 102, a wellbore completion (e.g., casing, cement, production tubing, packers), and/or downhole formations and interstitial fluid properties surrounding or otherwise adjacent the wellbore 102 may be monitored over time based on the acoustic sensing. Further, hydrocarbon production may be controlled, or reservoirs 108 may be managed, based on these monitored properties.

The wellbore 102 may have a casing 104 disposed within, through which production tubing 106 may be deployed as part of a wellbore completion. The DAS system 110 may comprise an acoustic energy source and a DAS device. An active acoustic energy source may generate and emit acoustic signals downhole. For some embodiments, an active acoustic energy source may not be involved in situations where acoustic signals are generated passively (e.g., seismic or microseismic activity). The acoustic signals may interact with the wellbore 102, the wellbore completion, and/or various downhole formations or fluids adjacent the wellbore, leading to transmitted, reflected, refracted, absorbed, and/or dispersed acoustic signals. Measured acoustic signals may have various amplitude, frequency, and phase properties affected by the downhole environment, which may stay constant or change over time. Useful instantaneous, relative changes, time lapse, or accumulated data may be derived from the DAS system 110.

An optical waveguide, such as an optical fiber, within the wellbore 102 may function as the DAS device, measuring disturbances in scattered light that may be propagated within the waveguide (e.g., within the core of an optical fiber). The disturbances in the scattered light may be due to the transmitted, reflected, and/or refracted acoustic signals, wherein these acoustic signals may change the index of refraction of the waveguide or mechanically deform the waveguide such that the optical propagation time or distance, respectively, changes.

The DAS device generally includes employing a single fiber or multiple fibers in the same well and/or multiple wells. For example, multiple fibers may be utilized in different sections of a well, so that acoustic sensing may be performed in the different sections. Sensing may occur at relative levels or stations, immediately adjacent depth levels, or spatially remote depths. The DAS device may involve continuous or periodic dense coiling around a conduit to enhance detection, and coiling the fiber in various physical forms or directions may enhance dimensional fidelity.

The system 110 may have various effective measurement spatial resolutions along the DAS device, depending on the selected pulse widths and optical power of the laser or light source, as well as the acoustic source signature. Therefore, the DAS device may be capable of producing the functional equivalent of tens, hundreds, or even thousands of acoustic sensors along the waveguide, wherein acoustic sensors and/or their functional DAS equivalents may be used for the DAS system 110 in addition to the acoustic source.

Downhole monitoring with distributed sensing systems may generate large amounts of data. Continuous monitoring of various properties, including temperature, pressure, Bragg gradient, acoustic, and strain, may create a large volume of data, possibly spanning into several gigabytes. Although this time-based data may provide insight into fluid flow inside the wellbore, methods of analyzing such large volume of data have been inefficient because, in most solutions, data is significantly down sampled and, therefore, the interpretation and analysis is relatively inaccurate.

SUMMARY OF THE INVENTION

In one embodiment, a method of analyzing measurements taken in a wellbore includes defining a page size for visualizing portions of the measurements, dividing the measurements into a number of pages, wherein each page corresponds to the page size, and rendering at least one page from the number of pages for visual analysis without any down-sampling and, thereby, maintaining the integrity of the original data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Data collected during reservoir monitoring may include fiber optic measurements utilizing a distributed sensing system, such as distributed temperature sensing (DTS) or distributed acoustic sensing (DAS). DTS may be based on distributed temperature derived from Raman back-scattered light from the sensor. DAS may be based on Coherent Optical time delay reflectometry (COTDR). Downhole monitoring with the distributed sensing system may generate large amounts of data, depending on the time interval and frequency of data measurements. Integrated sensing systems like distributed temperature and acoustic sensing (DTS and DAS) may also generate large data. For example, DAS data, when gathered at high frequency may generate in the order of 200 GB in a single day. As another example, distributed temperature measured along the length of the wellbore every minute, would generate 1,440 temperature profiles (24 hours×60 minutes=1,440 profiles), where each profile includes tens, hundreds, or even thousands of temperature measurements along the length of the wellbore. As a result, continuous monitoring of various properties, including temperature, pressure, Bragg gradient, acoustic, and strain, may create a large volume of data, possibly spanning into several gigabytes. Visualizing a large volume of time-based data, particularly in a three-dimensional space (3D) may provide insight into fluid flow inside the wellbore. Embodiments of the present invention provide techniques for visualizing a large volume of measurements taken in a wellbore in a three-dimensional space.

Figure 1:
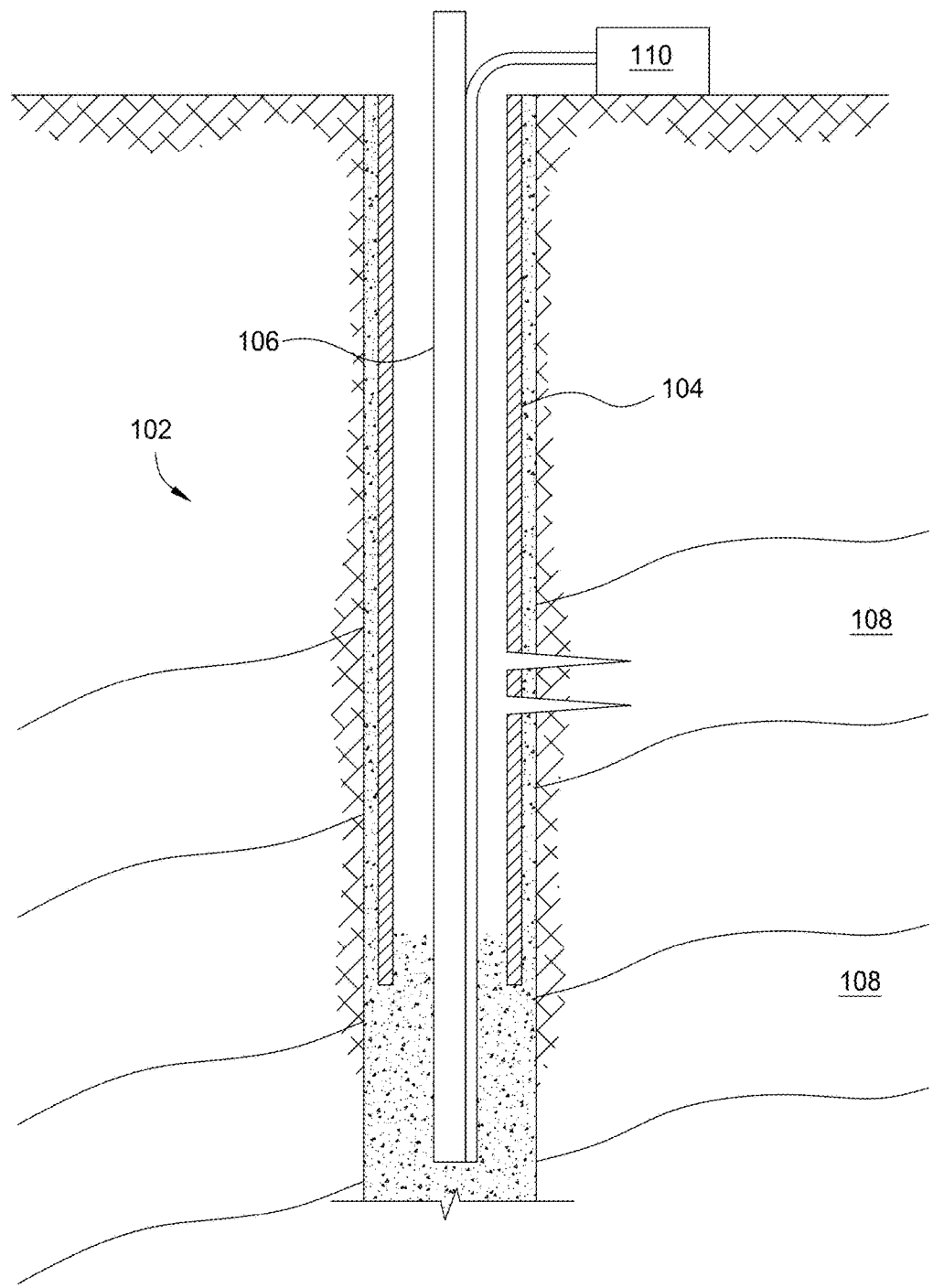
FIG. 1 illustrates a schematic cross-sectional view of a wellbore, wherein a distributed sensing system may be used to perform sensing, according to an embodiment of the present invention.
Figure 2:
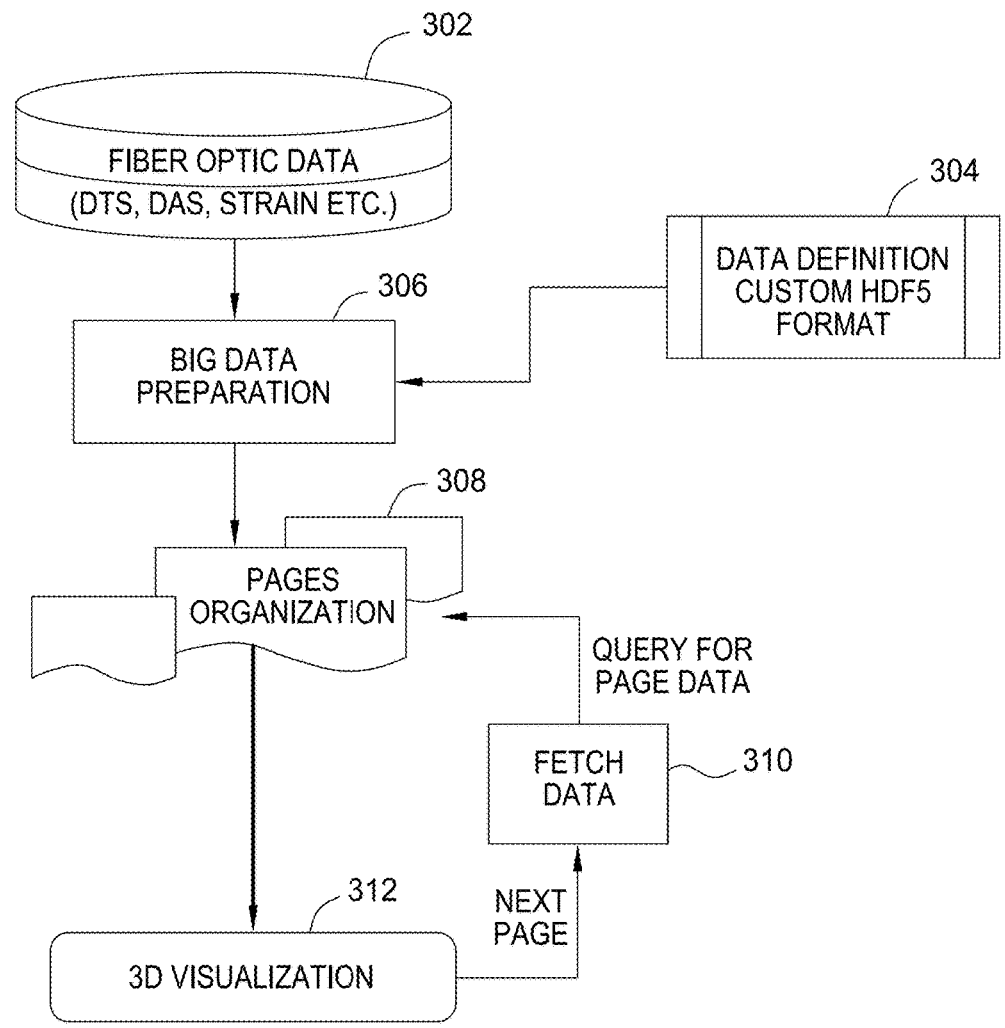
FIG. 2 illustrates a workflow for a page view implementation, according to an embodiment of the present invention.

FIG. 2 illustrates a workflow for a page view implementation, according to an embodiment of the present invention. The implementation may be performed, for example, by a computer (e.g., desktop or laptop). Fiber optic data 302 may be provided by a distributed sensing system (e.g., DTS or DAS), which may be several gigabytes worth of information. As mentioned above, the data may be used for determining trends over time. For certain embodiments, the data 302 may be real-time data collected from the wellbore.

The data may be prepared at 306 according to a data definition 304. The data may be prepared according to a custom hierarchical data format version 5 (HDF5) data format. The dataset in the HDF5 format may have at least two attributes. Units may be defined for each axis (X,Y,Z) in the three-dimensional space. Moreover, axes ranges may be defined (e.g., minimum and maximum values for the X,Y,Z axes). In the case of reservoir monitoring data, the axes may be time, depth, and measured property (e.g., temperature, acoustic, pressure, strain, Bragg gradient).

According to the data definition 304, a file may be created in the custom HDF5 format (e.g., HDF5 file). Each profile may be provided with a unique identifier. For example, the time stamp at which the profile is generated may be used as the unique identifier. For some embodiments, "profile" in this context is the set of measurements (e.g., temperature, pressure, acoustic, etc.) at each measured depth along the wellbore. As an example, the measured depth increment may be as small as 1 foot. In other words, a wellbore of 15,000 feet total depth may have a temperature profile with 15,000 points of measurements.

Once the file representative of the fiber optic data 302 is created at 306, the data may be organized into pages at 308. For some embodiments, "page" may be a chunk of data that can be visualized without any significant loss of quality or resolution. The total number of profiles in the data and the size for each profile may be considered for the pages organization. The size of each page may vary (e.g., between 1 MB to 1 GB) and may be user-selectable. For some embodiments, the maximum page size may be dependent on the physical memory of the computer performing the implementation. For example, if the computer memory is less than 3 GB, the maximum page size may be 100 MB.

Once the page size is determined, the total number of profiles that can fit in a page may be calculated (e.g., according to the size of the profiles). Upon determining the total number of profiles that can fit in a page, the total number of pages of the file may be calculated. In other words, the number of pages of the file may be determined based on the number of profiles that fit on a user-selectable page size. For example, if the page size is 100 MB, and there are 100 profiles that are 10 MB each, each page may have 10 profiles (10×10 MB=100 MB). As a result, the data may be organized into 10 pages.

Upon determining the total number of pages of the file, each page may have a start time, an end time, and a page number. For example, the start and end times of a particular page may be dependent on the profiles found on the particular page. Upon selecting a page or time stamp for viewing at 310 (e.g., by a user of the computer), the data file may be read with the corresponding time stamp.

At 312, the computer may provide a 3D visualization of the page selected at 310 by rendering the corresponding data to an output, such as a monitor of the desktop or laptop. For some embodiments, Open Graphics Library (OpenGL) libraries (e.g., with JAVA wrapper) or JAVA 3D libraries may be used for 3D visualization of the page data. In addition to the 3D visualization, 3D rotation and zooming may be provided by the OpenGL libraries. The implementation of OpenGL libraries is not restricted to any programming language.

Variations in the measurements illustrated in the 3D visualizations may be shown by shading or coloring, for example. For example, a red, green, and blue (RGB) gradient pattern may be applied to temperature data, to illustrate the variations in temperature over time or at different depths.

For some embodiments, a banded color map may be utilized, where a property scale (e.g., associated with temperature, pressure, or acoustic) may be divided into user-defined intervals, and a particular color may be applied to each interval. Allowing users the flexibility to define intervals may aid in the identification of small changes in data. For example, a one degree temperature change may be visualized using the banded color map. For some embodiments, a combination of color scales, such as the RGB gradient pattern and the banded color map, may be defined and applied.

For some embodiments, color scales may be defined for a given field (e.g., an exploration area), and may be applied to all wells monitored in that field. Having a similar color scale for all the wells monitored in a field may allow for consistent visualization capabilities and comparison between the wells.

Figure 3:
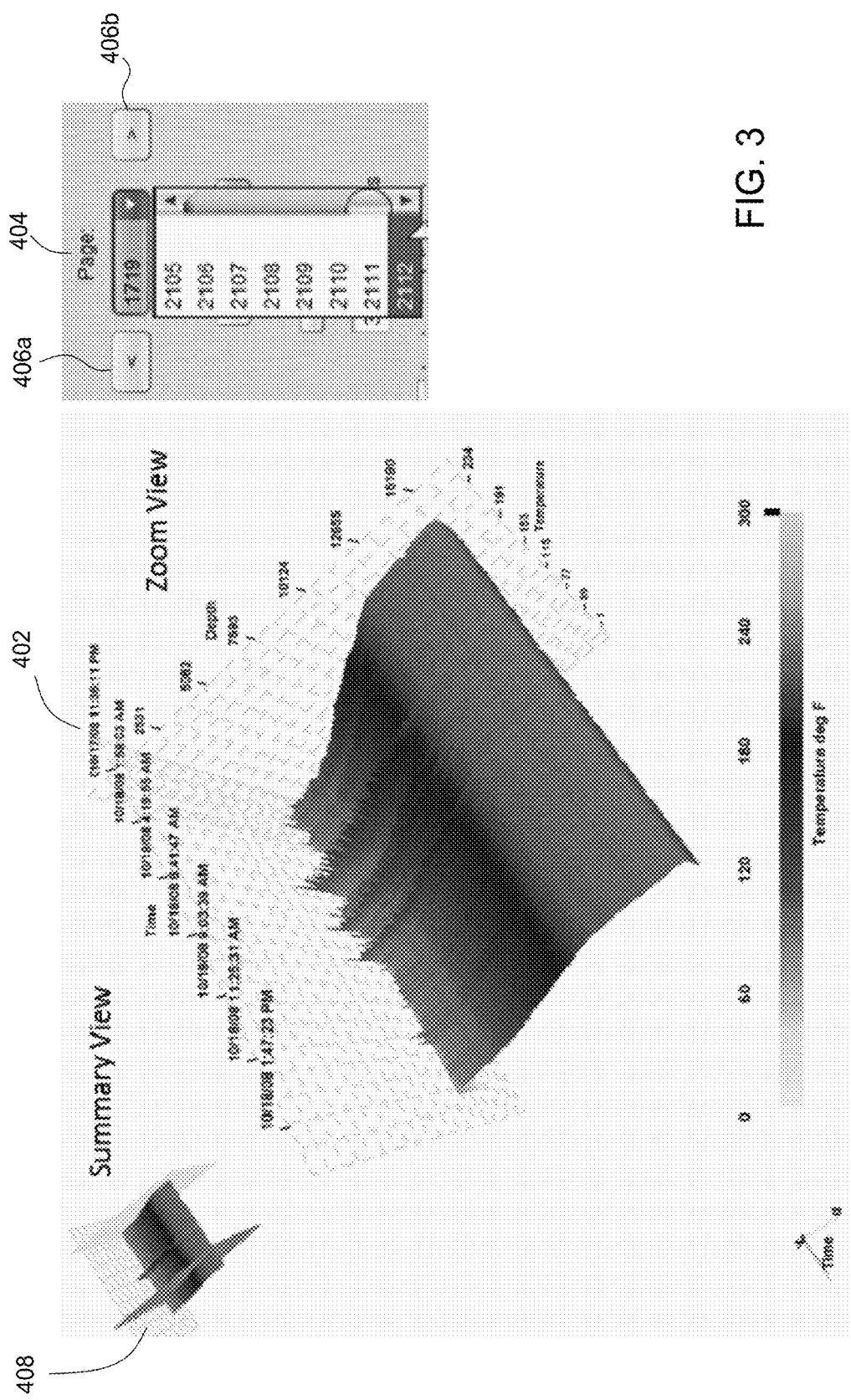
FIG. 3 illustrates a 3D visualization produced from the page view implementation, according to an embodiment of the present invention.

FIG. 3 illustrates a 3D visualization produced from the page view implementation, according to an embodiment of the present invention. The 3D visualization may produce a zoom view 402 and a summary view 408. The zoom view 402 may provide a 3D representation of data that fits in a single page, utilizing the page view implementation described above. However, a summary view 408 may provide a 3D representation of the entire dataset (e.g., the HDF5 file). In order to provide the 3D representation of the entire dataset, downsampling may be required (e.g., by utilizing every other profile in the dataset). For some embodiments, a user may select a page 404 to view. As described above, the page 404 may have a start time, an end time, and a page number. Giving a user the flexibility to select a particular page may allow the user to analyze measurements during a particular time frame. Users may also be provided the flexibility to go page by page using the previous and next page buttons 406$_a$, 406$_b$.

Figure 4:
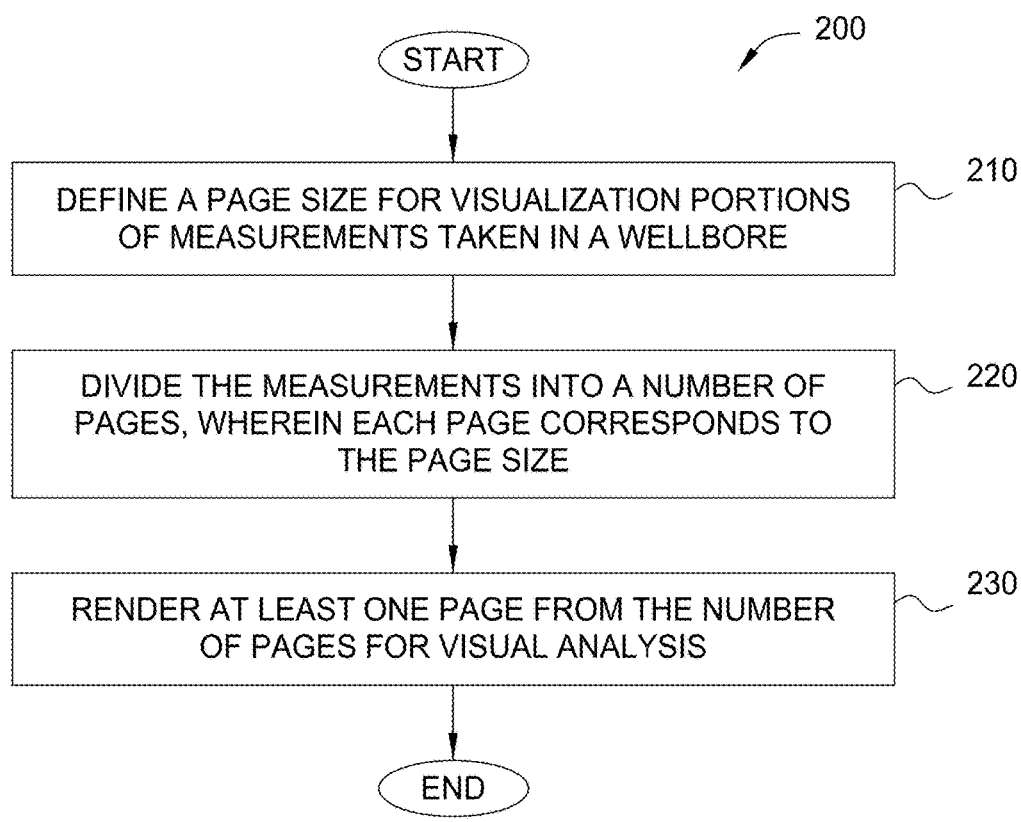
FIG. 4 illustrates example operations for visualizing measurements taken in a wellbore, according to an embodiment of the present invention.

FIG. 4 illustrates example operations 200 for analyzing measurements taken in a wellbore (e.g., by DTS or DAS), according to an embodiment of the present invention. The operations 200 may be performed, for example, by a processor. At 210, the processor may define a page size for visualizing portions of the measurements.

At 220, the processor may divide the measurements into a number of pages, wherein each page corresponds to the page size.

At 230, the processor may render at least one page (e.g., user-selectable) from the number of pages for visual analysis. For some embodiments, the rendering may generate a 3D visualization of a particular portion of the measurements that corresponds to the at least one page. Two axes of the 3D visualization may represent times and depths the particular portion of the measurements are taken. For some embodiments, variations in the particular portion of the measurements may be indicated by coloring. For some embodiments, the processor may render the number of pages for visualizing the measurements taken in the wellbore, wherein the rendering the number of pages generally includes downsampling.

Downhole monitoring with distributed sensing systems may generate large amounts of data. Continuous monitoring of various properties, including temperature, pressure, Bragg gradient, acoustic, and strain, may create a large volume of data, possibly spanning into several gigabytes. Visualizing a large volume of time-based data, particularly in a three-dimensional space (3D) may provide insight into fluid flow inside the wellbore. Embodiments of the present invention provide techniques for visualizing a large volume of measurements taken in a wellbore in a three-dimensional space.

Figure 5:
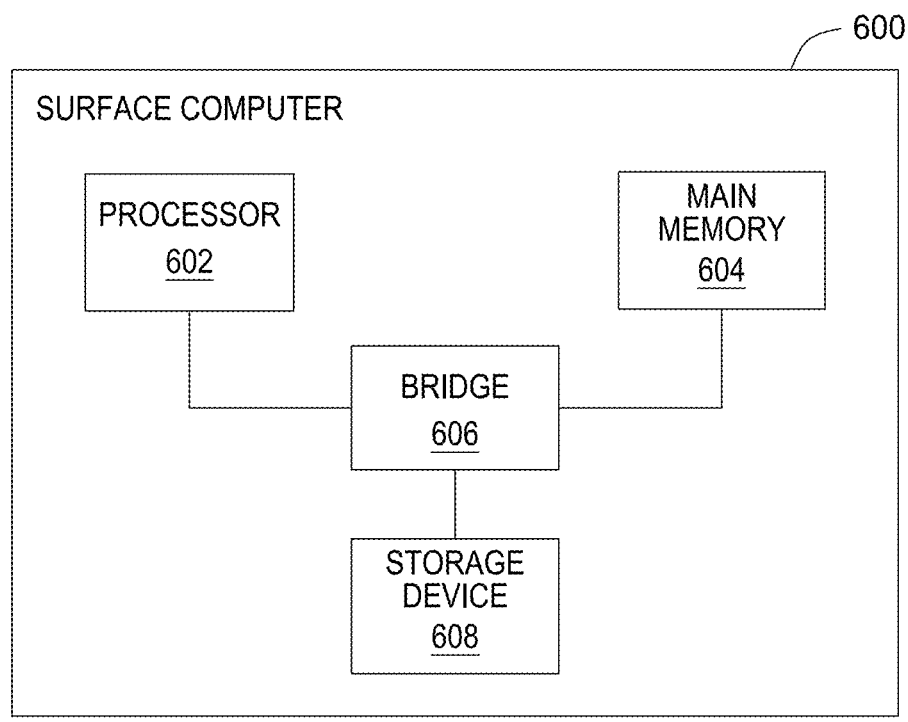
FIG. 5 illustrates a computer system, according to an embodiment of the present invention.

In accordance with at least some embodiments, the processing to visualize measurements taken in a wellbore may be performed, for example, by a computer. FIG. 5 illustrates in greater detail a computer 600. The computer 600 generally includes a processor 602, and the processor 602 couples to a main memory 604 by way of a bridge device 606. Moreover, the processor 602 may couple to a long term storage device 608 (e.g., a hard drive) by way of the bridge device 606. Programs executable by the processor 602 may be stored on the long term storage device 608, and accessed when needed by the processor 602. The program stored on the long term storage device 608 may comprise programs to implement the various embodiments of the present specification, including programs to visualize the measurements taking in a wellbore. In some cases, the programs may be copied from the long term storage device 608 to the main memory 604, and the programs may be executed from the main memory 604.

Advantageously, techniques disclosed herein may break down large amounts of reservoir monitoring data from Distributed Sensing Systems (e.g., DTS, DAS, Strain, Pressure, Bragg Grating (FBG)) into manageable chunks ("pages") of data, thereby providing efficient visualization and analysis of such large data with any computer configuration without downsampling or data modification. The techniques may be applied to organize, visualize and analyze various types of distributed measurement sensing data including data for Temperature (DTS—Distributed Temperature Sensing), Strain, Pressure, Acoustic (DAS—Distributed Acoustic Sensing). One embodiment may include a method of organizing, visualizing and analyzing measurements taken along the wellbore or oil and gas reservoir over a long period of time (at frequent time steps), and include a method of dividing the data into portions ("pages") without downsampling of the data; a method of navigating large time based reservoir monitoring datasets through portions of data ("pages") for visualization and analysis; based on the computer memory and hard disk space, defining a manageable chunk of data "page and size" for visualizing portions of the measurements; dividing the large amount of time based measurements into a number of pages; and rendering at least one page from the number of pages for visual analysis. In a further embodiment, the data may be represented in a three dimensional space (3D) visualization of particular portions of measurements that corresponds to at least one page, the three axes for 3D visualization representing time, depth and measurement (temperature, pressure, acoustic, strain, Bragg Grating (FBG)), thereby showing the variation of the measurement in depth and in time. The pages may be rendered through continuous page navigation, and the rendering may or may not be downsampled. In yet another embodiment, the managing, visualizing, and analyzing of large reservoir monitoring data (DTS, DAS, Strain, and Pressure) may be performed on a computer configured with 2 GB memory, or more, assuming all measurement data is stored on internal or external disk via network or USB connection. For example, the visualization and analyzing of large reservoir monitoring data (DTS, DAS, Strain, and Pressure) may be performed on a Windows® Operating System tablet with at least 2 GB RAM and an Atom™ processor.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The above discussion is meant to be illustrative of the principles and various embodiments of the present invention. Numerous variations and modifications will become apparent to those skilled in the art.

While the foregoing is directed to embodiments of the present invention, other and further embodiments of the invention may be devised without departing from the basic scope thereof, and the scope thereof is determined by the claims that follow.

The invention claimed is:

1. A method of organizing, visualizing, and/or analyzing oilfield measurements, the method comprising:
storing the oilfield measurements as profiles in one or more files, each of the profiles including a set of measurements at a respective time at each measured depth along a wellbore;
determining a page size for visualizing portions of the measurements in the one or more files or a real-time stream based on at least an available physical memory of a computer system which performs rendering;
dividing the profiles in the one or more files or the real-time stream into a plurality of pages based on the page size, wherein each of the pages corresponds to the page size and includes a respective set of profiles, the respective set of profiles comprising a plurality of profiles with measurements from a start time to an end time, thereby indicating measurement variations in space and time;
displaying, on a display unit, a user interface configured to indicate the plurality of pages corresponding to the page size and to permit selection of the pages;
responsive to receiving a user selection of one of the plurality of pages via the user interface, rendering a set of profiles associated with the selected page, wherein the rendering generates a three-dimensional (3D) visualization of a portion of the measurements corresponding to the set of profiles associated with the selected page and showing measurement variations in space and time in the selected page, and wherein the 3D visualization includes a graph with axes representing time, depth, and measurement; and
displaying the rendering of the selected page on the display unit.

2. The method of claim 1, wherein variations in the portion of the measurements are indicated by coloring.

3. The method of claim 2, wherein a property scale is divided into user-defined intervals, with a respective color being applied to each interval.

4. The method of claim 1, further comprising:
rendering the plurality of pages for visualizing the measurements, wherein the rendering is through continuous page navigation.

5. The method of claim 1, wherein the measurements are distributed measurement sensing measurements of one of temperature, strain, pressure, and acoustic.

6. The method of claim 1, wherein rendering the selected page does not comprise downsampling.

7. The method of claim 1, wherein the page size is determined based on the available physical memory and hard disk space of the computer system which performs the rendering.

8. The method of claim 1, wherein the rendering of the at least one page provides real-time visualization and interpretation of spatial measurements.

9. The method of claim 1, wherein changes in the oilfield measurements in data and time are stored in the one or more files.

10. The method of claim 1, further comprising:
displaying a downsampled representation of all of the oilfield measurements in the one or more files, wherein the downsampled representation and the rendering of the selected page are displayed alongside the user interface indicating the plurality of pages corresponding to the page size.

11. A non-transitory computer-readable storage medium storing instructions that, when executed by a processor, cause a computer system to organize, visualize, and/or analyze oilfield measurements, by performing steps comprising:
storing the oilfield measurements as profiles in one or more files, each of the profiles including a set of measurements at a respective time at each measured depth along a wellbore;
determining a page size for visualizing portions of the measurements in the one or more files or a real-time stream based on at least an available physical memory of a computer system which performs rendering;
dividing the profiles in the one or more files or the real-time stream into a plurality of pages based on the page size, wherein each of the pages corresponds to the page size and includes a respective set of profiles, the respective set of profiles comprising a plurality of profiles with measurements from a start time to an end time, thereby indicating measurement variations in space and time
displaying, on a display unit, a user interface configured to indicate the plurality of pages corresponding to the page size and to permit selection of the pages;
responsive to receiving a user selection of one of the plurality of pages via the user interface, rendering a set of profiles associated with the selected page, wherein the rendering generates a three-dimensional (3D) visualization of a portion of the measurements corresponding to the set of profiles associated with the selected page and showing measurement variations in space and time in the selected page, and wherein the 3D visualization includes a graph with axes representing time, depth, and measurement; and
displaying the rendering of the selected page on the display unit.

12. The computer-readable storage medium of claim 11, wherein variations in the portion of the measurements are indicated by coloring.

13. The computer-readable storage medium of claim 11, the steps further comprising:
rendering the plurality of pages for visualizing the measurements, wherein the rendering is through continuous page navigation.

14. The computer-readable storage medium of claim 11, wherein the measurements are distributed measurement sensing measurements of one of temperature, strain, pressure, and acoustic.

15. The computer-readable storage medium of claim 11, wherein rendering the selected page does not comprise downsampling.

16. The computer-readable storage medium of claim 11, wherein the page size is determined based on the available memory and hard disk space of the computer system.

17. A computer system, comprising:
a processor configured to organize, visualize, and/or analyze oilfield measurements, by performing steps comprising:
storing the oilfield measurements as profiles in one or more files, each of the profiles including a set of measurements at a respective time at each measured depth along a wellbore, determining a page size for visualizing portions of the measurements in the one or more files or a real-time stream based on at least an available physical memory of a computer system which performs rendering, dividing the profiles in the one or more files or the real-time stream into a plurality of pages based on the page size, wherein each of the pages corresponds to the page size and includes a respective set of profiles, the respective set of profiles comprising a plurality of profiles with measurements from a start time to an end time, thereby indicating measurement variations in space and time, displaying, on a display unit, a user interface configured to indicate the plurality of pages corresponding to the page size and to permit selection of the pages, responsive to receiving a user selection of one of the plurality of pages via the user interface, rendering a set of profiles associated with the selected page, wherein the rendering generates a three-dimensional (3D) visualization of a portion of the measurements corresponding to the set of profiles associated with the selected page and showing measurement variations in space and time in the selected page, and wherein the 3D visualization includes a graph with axes representing time, depth, and measurement, and displaying the rendering of the selected page on the display unit.

* * * * *